UNITED STATES PATENT OFFICE.

JEFFERSON D. HOLLINGSWORTH AND JOHN MITCHEM, OF KUSA, OKLAHOMA.

PLASTIC COMPOSITION AND PROCESS OF PRODUCING THE SAME.

1,249,960.     Specification of Letters Patent.     Patented Dec. 11, 1917.

No Drawing.     Application filed January 4, 1917. Serial No. 140,557.

*To all whom it may concern:*

Be it known that we, JEFFERSON D. HOLLINGSWORTH and JOHN MITCHEM, citizens of the United States, residing at Kusa, in the county of Okmulgee and State of Oklahoma, have invented certain new and useful Improvements in Plastic Compositions and Processes of Producing the Same, of which the following is a specification.

Our invention relates to a composition of matter, adapted for making retorts used in the smelting of ores, especially western zinc ores, while not necessarily restricted to such use, and to a process of producing the same.

As is well known the composition for making retorts used in the smelting of ores, consists of fire clay, fire clay cement, and water. It has been found that this composition is readily destroyed by the action of western zinc ores, and ordinarily has a life of about eight to twenty days.

We have discovered that by making the retorts of a composition comprising fire clay, fire clay cement, graphite, salt and water, the destructive effects of the ores, such as the western zinc ores, are largely overcome, and the durability of the retort greatly increased, the same having a life of about sixty days.

Our composition consists of the following ingredients, preferably combined in the proportions stated:

| | |
|---|---|
| Commercial fire clay, (St. Louis brand preferred) | 36 pounds |
| Fire clay cement (produced by burning the raw fire clay to a lump or hard condition and then grinding to a powder) | 59 pounds |
| Commercial graphite, (preferably commercial graphite designated as c c and g by the Joseph Dixon Crucible Co. of Jersey City) | 14 pounds |
| Commercial salt, sodium chlorid | 1 pound |
| Water, approximately | 4 pounds |

In the practice of our process in producing the composition, the 4 pounds of water, or a sufficient amount of water to mix with the ingredients for producing a mass having a consistency of dough, is placed in a receptacle and the one pound of salt is added. This mixture is thoroughly stirred until the salt is dissolved. The 36 pounds of fire clay, 59 pounds of fire clay cement, and 14 pounds of graphite are preferably thoroughly mixed in a separate receptacle, in a dry condition. The prepared liquid, and the powdered mixture are then gradually fed into a pug mill, and the whole mass is thoroughly mixed therein, so as to produce a composition having the consistency of dough.

This composition is then allowed to stand under ordinary atmospheric conditions for a substantial period, to wit, about 24 hours, after which it is molded into the retort by a hydraulic press. This composition, thus molded, is allowed to remain in a dry-heated room, at a temperature of approximately 120 degrees F. until thoroughly dried, which ordinarily varies from fifteen to twenty days, in accordance with atmospheric conditions.

If the furnace is cold the retort may be immediately placed therein, but if the furnace is hot the retort is first gradually heated before being placed therein.

It is to be understood that our invention is not at all restricted to the precise proportions of the ingredients employed as such proportions may be widely varied, as may be found advantageous, the proportions given, however, being preferred and have been found to produce the most satisfactory results.

Having thus described our invention, we claim:

1. A plastic composition for use in manufacturing retorts, comprising substantially 36 pounds of fire clay, substantially 59 pounds of fire clay cement, substantially 14 pounds of graphite and substantially one pound of common salt.

2. The herein described process of producing a plastic material for use in manufacturing retorts, which consists in dissolving salt in water, mixing in a dry state fire clay, fire clay cement, and graphite, introducing the dry mixture into the saline liquid and thoroughly mixing the same for forming a mass having substantially the consistency of dough.

3. The herein described process of manufacturing a retort, which consists in dissolving salt in water, mixing in a dry state fire clay, fire clay cement, and graphite, introducing the dry mixture into the saline liquid and thoroughly mixing them for forming a mass having substantially the consistency of dough, allowing the mass to stand under ordinary atmospheric conditions for a substantial period, molding the mass into the retort, and placing the retort thus formed in a dry-heated room having a temperature to thoroughly dry the mass.

In testimony whereof we affix our signatures in the presence of two witnesses.

JEFFERSON D. HOLLINGSWORTH.
JOHN MITCHEM.

Witnesses:
JNO. F. GOSHORN,
J. B. DICKINSON.